US006994740B2

(12) United States Patent
Gammack et al.

(10) Patent No.: US 6,994,740 B2
(45) Date of Patent: Feb. 7, 2006

(54) CYCLONIC SEPARATING APPARATUS INCLUDING UPSTREAM AND DOWNSTREAM CYCLONE UNITS

(75) Inventors: Peter David Gammack, Bath (GB); Remco Douwinus Vuijk, Bath (GB); Ricardo Gomiciaga Pereda, Malmesbury (GB)

(73) Assignee: Dyson Limited, Wiltshire (GB)

( * ) Notice: Subject to any disclaimer, the term of this patent is extended or adjusted under 35 U.S.C. 154(b) by 0 days.

(21) Appl. No.: 10/640,568

(22) Filed: Aug. 14, 2003

(65) Prior Publication Data

US 2004/0144070 A1 Jul. 29, 2004

Related U.S. Application Data

(63) Continuation of application No. 09/986,076, filed on Nov. 7, 2001, now Pat. No. 6,607,572.

(30) Foreign Application Priority Data

Feb. 24, 2001 (GB) .......................................... 0104668
Apr. 12, 2001 (GB) .......................................... 0109405

(51) Int. Cl.
*B01D 45/12* (2006.01)

(52) U.S. Cl. ............................ 55/343; 55/349; 55/424; 55/459.1; 55/DIG. 3

(58) Field of Classification Search .................. 55/343, 55/345, 346, 349, 424, 459.1; 15/350, 353
See application file for complete search history.

(56) References Cited

U.S. PATENT DOCUMENTS

| | | | | | |
|---|---|---|---|---|---|
| 2,700,468 | A | | 1/1955 | Fontein | |
| 2,837,172 | A | * | 6/1958 | Klein et al. | 55/345 |
| 3,283,480 | A | * | 11/1966 | Szego | 55/340 |
| 3,425,192 | A | | 2/1969 | Davis | |
| 4,373,228 | A | | 2/1983 | Dyson | |
| 4,673,495 | A | | 6/1987 | Carroll et al. | |
| 4,927,536 | A | * | 5/1990 | Worrell et al. | 210/512.2 |
| 6,141,826 | A | | 11/2000 | Conrad et al. | |
| 6,277,278 | B1 | | 8/2001 | Conrad et al. | |
| 6,391,095 | B1 | | 5/2002 | Conrad et al. | |
| 2001/0042713 | A1 | | 11/2001 | Conrad et al. | |

FOREIGN PATENT DOCUMENTS

| | | |
|---|---|---|
| DE | 615004 | 5/1935 |
| DE | 44 04 661 | 8/1995 |
| EP | 0 037 674 | 8/1985 |
| EP | 0 042 723 | 8/1985 |
| WO | WO 00/10718 | 2/2000 |
| WO | WO 00/10719 | 2/2000 |

* cited by examiner

*Primary Examiner*—Robert A. Hopkins
(74) *Attorney, Agent, or Firm*—Morrison & Foerster LLP

(57) ABSTRACT

The invention provides cyclonic separating apparatus comprising an upstream cyclone unit and a downstream cyclone unit, the upstream cyclone unit including at least one cyclone having a first end and a second end, and the downstream cyclone unit including at least one cyclone having a first end and a second end. The upstream and downstream cyclone units of the cyclonic separation apparatus are arranged relative to one another so that the orientation of at least one cyclone of the downstream cyclone unit is substantially inverted with respect to the orientation of at least one cyclone of the upstream cyclone unit. The arrangement provides an apparatus in which good separation efficiency is achieved as well as low pressure drop across the apparatus as a whole.

40 Claims, 6 Drawing Sheets

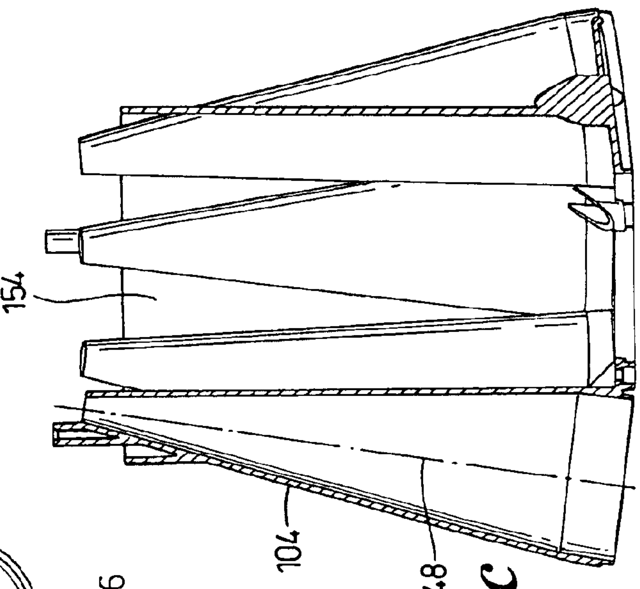
Fig. 4c
Fig. 4b
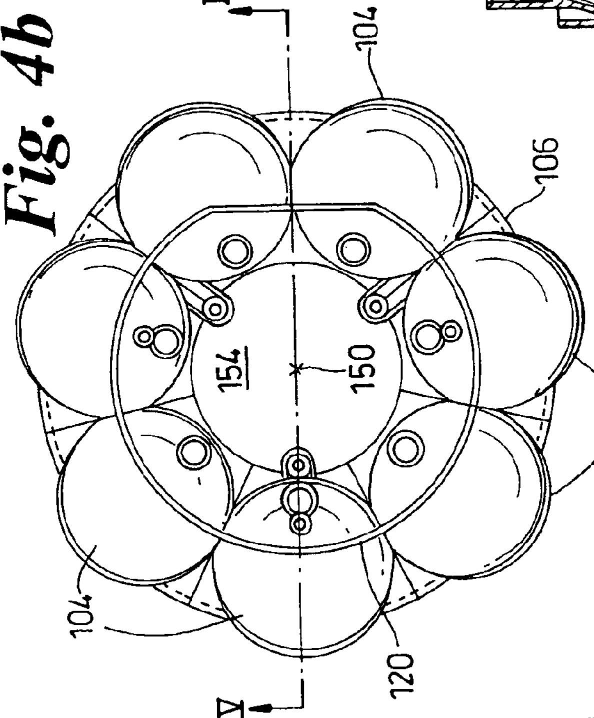
Fig. 4a
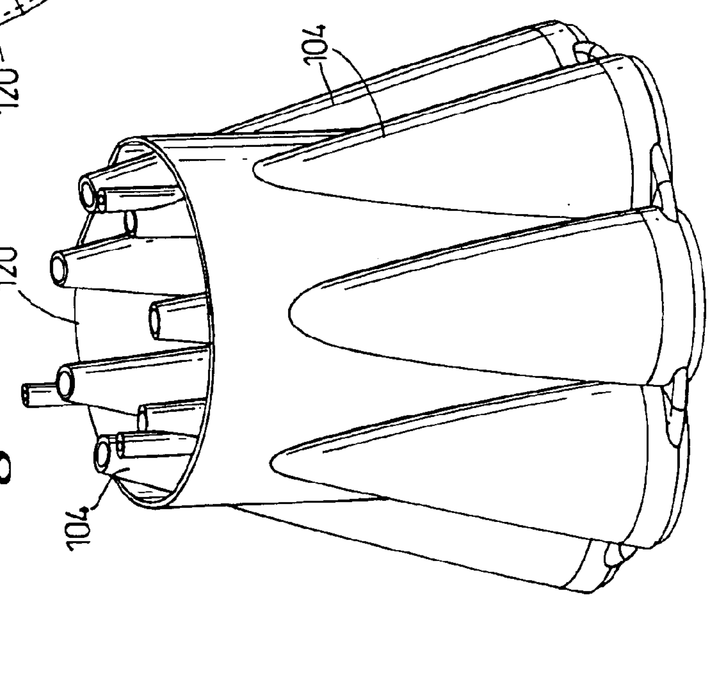

CYCLONIC SEPARATING APPARATUS INCLUDING UPSTREAM AND DOWNSTREAM CYCLONE UNITS

This application is a continuation of Ser. No. 09/986,076, filed Nov. 7, 2001, now U.S. Pat. No. 6,607,572.

FIELD OF THE INVENTION

The invention relates to cyclonic separating apparatus. Particularly, but not exclusively, the invention relates to cyclonic separating apparatus for use in vacuum cleaners.

BACKGROUND OF THE INVENTION

Cyclonic separating apparatus are well known and have uses in a wide variety of applications. Over the last decade or so, the use of cyclonic separating apparatus to separate particles from an airflow in a vacuum cleaner has been developed and introduced to the market. Detailed descriptions of cyclonic separating apparatus for use in vacuum cleaners are given in, inter alia, U.S. Pat. Nos. 3,425,192 and 4,373,228 and EP 0 042 723. From these and other prior art documents, it can be seen that it is known to provide two cyclone units in series so that the airflow passes sequentially through at least two cyclones. This allows the larger dirt and debris to be extracted from the airflow in the first cyclone, leaving the second cyclone to operate under optimum conditions and so effectively to remove very fine particles in an efficient manner. This type of arrangement has been found to be effective when dealing with airflows in which is entrained a variety of matter having a wide particle size distribution. Such is the case in vacuum cleaners.

It is also desirable for vacuum cleaners to be both compact and energy efficient. A further desirable feature is a large capacity for collecting dirt and debris to reduce the frequency of emptying. In some known arrangements, the downstream cyclone has been placed inside the upstream cyclone in an attempt to minimize the size of the cleaner (see, for example, U.S. Pat. No. 4,373,228 and EP 0 042 723). However, this reduces the capacity of the cleaner because the downstream cyclone occupies a space which would otherwise be available for dirt and dust collection. In arrangements of the type shown in U.S. Pat. No. 3,425,192, the downstream cyclones are located outside the upstream cyclone but the partially cleaned air exiting from the upstream cyclone must then travel some distance to the inlets of the downstream cyclones. This increases the pressure drop across the system as a whole and thus reduces the energy efficiency of the system. Furthermore, the volume of the means for conducting the partially cleaned air adds to the overall volume of the machine.

SUMMARY OF THE INVENTION

The present invention provides a cyclonic separating apparatus which has an improved capacity for collecting separated particles and an improved energy efficiency. The invention also provides a cyclonic separating apparatus suitable for use in vacuum cleaners and capable of achieving improved performance compared to the prior art. Another feature of the invention is to provide a cyclonic separating apparatus capable of mitigating the disadvantages of the prior art.

The invention provides a cyclonic separating apparatus that includes an upstream cyclone unit and a downstream cyclone unit. The upstream cyclone unit includes at least one cyclone having a first end and a second end, and the downstream cyclone unit includes at least one cyclone having a first end and a second end, with the upstream and downstream cyclone units arranged relative to one another so that the orientation of at least one cyclone of the downstream cyclone unit is substantially inverted with respect to the orientation of at least one cyclone of the upstream cyclone unit.

The inversion of the downstream cyclone unit with respect to the upstream cyclone unit allows the cyclone units to be arranged in a manner which reduces the length of the airflow path between the upstream cyclone unit and the downstream cyclone unit, particularly when the downstream cyclone unit is located outside the upstream cyclone unit. This means that the pressure drop across the entire apparatus can be kept to a minimum, thereby increasing the energy efficiency of the apparatus, while the collecting capacity of the apparatus is maintained as high as possible.

In a preferred embodiment, the downstream cyclone unit is located outside the upstream cyclone unit, and both cyclone units are arranged substantially vertically with the first end of one or more cyclones of the upstream cyclone unit uppermost and the first end of one or more cyclones of the downstream cyclone unit lowermost. Thus, the outlet or outlets of the cyclones of the upstream cyclone unit are located close to the inlets of the cyclone or cyclones of the downstream cyclone unit. This ensures that the length of the airflow path between the cyclone units is minimized so that losses are kept to a minimum. The second ends of one or more cyclones of the downstream cyclone unit project away from the upstream cyclone unit rather than being located inside the upstream cyclone unit. This maximizes the capacity of the upstream cyclone unit for collecting dirt and debris and thus reduces the frequency with which the upstream cyclone unit requires emptying.

A preferred feature of the aforementioned embodiment is that the cyclones of the downstream cyclone unit are inclined with respect to one another so that the said cyclones approach one another at the second ends thereof. This arrangement discourages deposition of separated fine dirt and dust on the outer surfaces of the cyclones of the upstream cyclone unit.

It is preferred that the apparatus according to the invention is incorporated into a vacuum cleaner, preferably a domestic vacuum cleaner. This is because the combined advantages of increased collecting capacity and reduced pressure drop are particularly useful in a vacuum cleaner. The user sees the benefits of reduced power consumption and less frequent emptying procedures.

Other preferred features are set out in the description below, the claims and the appended drawings.

BRIEF DESCRIPTION OF THE DRAWINGS

Embodiments of the invention will now be described with reference to the accompanying drawings, wherein:

FIGS. 4*a*, 4*b* and 4*c* are perspective, plan and sectional side views, respectively, of a portion of the cyclonic separating apparatus of FIGS. 2*a*, 2*b* and 2*c*, FIG. 4*c* being taken along line IV—IV of FIG. 4*b;*

DETAILED DESCRIPTION OF THE INVENTION

Figure 1A:
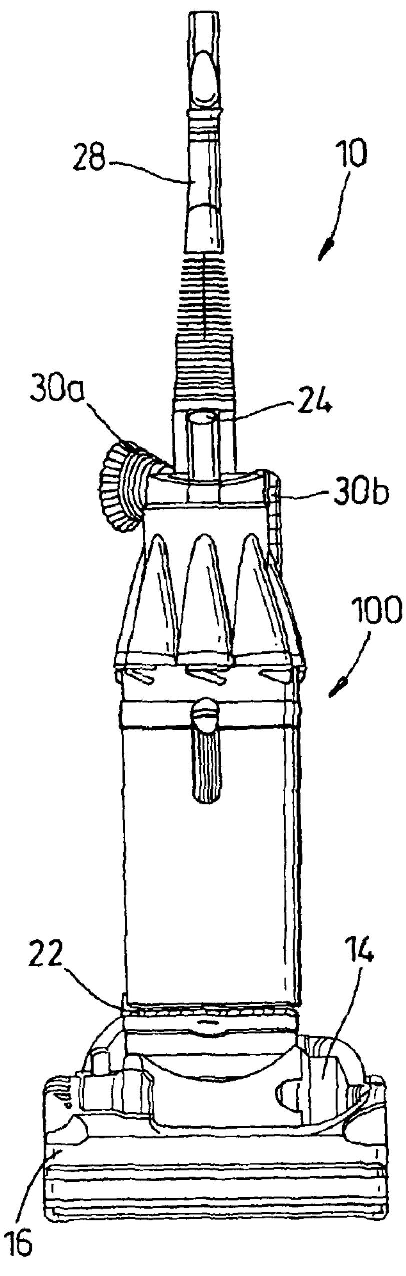
FIGS. 1*a* and 1*b* are front and side views, respectively, of a vacuum cleaner incorporating cyclonic separating apparatus according to the invention.
Figure 1B:
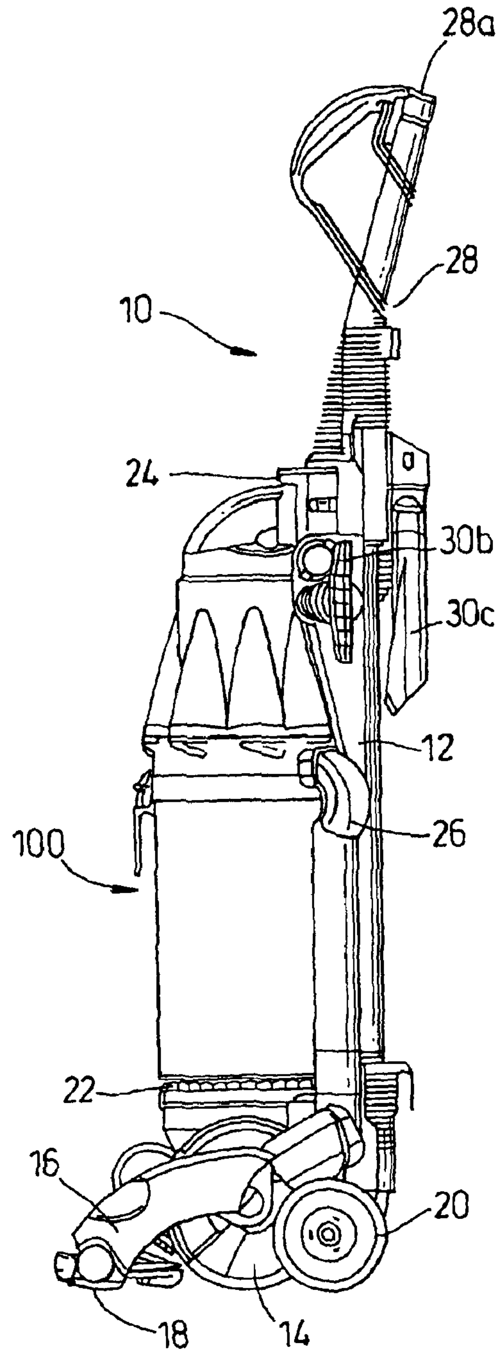

FIGS. 1*a* and 1*b* show a domestic vacuum cleaner 10 incorporating a cyclonic separating apparatus according to the present invention. The vacuum cleaner 10 includes an upstanding body 12 at a lower end of which is located a motor casing 14. A cleaner head 16 is mounted in an articulated fashion on the motor casing 14. A suction inlet 18 is provided in the cleaner head 16 and wheels 20 are rotatably mounted on the motor casing 14 to allow the vacuum cleaner 10 to be maneuvered over a surface to be cleaned.

Cyclonic separating apparatus 100 is mounted on the upstanding body 12 above the motor casing 14. The cyclonic separating apparatus 100 is seated on a generally horizontal surface formed by a filter cover 22. The filter cover 22 is located above the motor casing 14 and provides a cover for a post-motor filter (not shown). The cyclonic separating apparatus 100 is also secured to the upstanding body 12 by means of a clip 24 located at the top of the cyclonic separating apparatus 100. The upstanding body 12 incorporates upstream ducting (not shown) for carrying dirty air to an inlet of the cyclonic separating apparatus 100 and downstream ducting 26 for carrying cleaned air away from the cyclonic separating apparatus 100.

The upstanding body 12 further incorporates a hose and wand assembly 28 which may be retained in the configuration shown in the drawings so as to function as a handle for maneuvering the vacuum cleaner 10 over a surface to be cleaned. Alternatively, the hose and wand assembly 28 may be released to allow the distal end 28*a* of the wand to be used in conjunction with a floor tool (not shown) to perform a cleaning function, e.g., on stairs, upholstery, etc. The structure and operation of the hose and wand assembly 28 are not material to the present invention and will not be described any further here. The general structure and operation of the hose and wand assembly 28 illustrated in FIGS. 1*a* and 1*b* are similar to that described in U.S. Pat. No. 32,257, the disclosure of which is incorporated herein by reference. Also, several tools and accessories 30*a*, 30*b*, 30*c*, are releasably mounted on the upstanding body 12 for storage purposes between periods of use.

The precise details of the features of the vacuum cleaner 10 described above are not material to the present invention. The invention is concerned with the details of the cyclonic separation apparatus 100 forming part of the vacuum cleaner 10. In order for the cyclonic separation apparatus 100 to be brought into operation, the motor located in the motor casing 14 is activated so that air is drawn into the vacuum cleaner via either the suction inlet 18 or the distal end 28*a* of the hose and wand assembly 28. This dirty air (being air having dirt and dust entrained therein) is passed to the cyclonic separation apparatus 100 via the upstream ducting. After the air has passed through the cyclonic separation apparatus 100, it is ducted out of the cyclonic separating apparatus 100 and down the upstanding body 12 to the motor casing 14 via the downstream ducting 26. The cleaned air is used to cool the motor located in the motor casing 14 before being exhausted from the vacuum cleaner 10 via the filter cover 22.

Figure 2A:
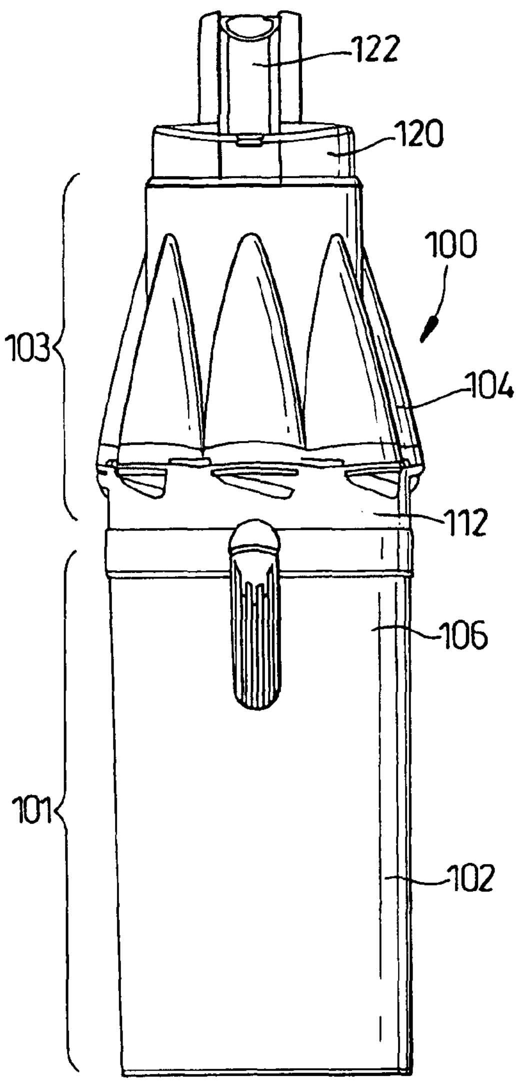
FIGS. 2*a*, 2*b* and 2*c* are front, side and plan views, respectively, of a first embodiment of cyclonic separating apparatus forming part of the vacuum cleaner of FIGS. 1*a* and 1*b;*
Figure 2B:
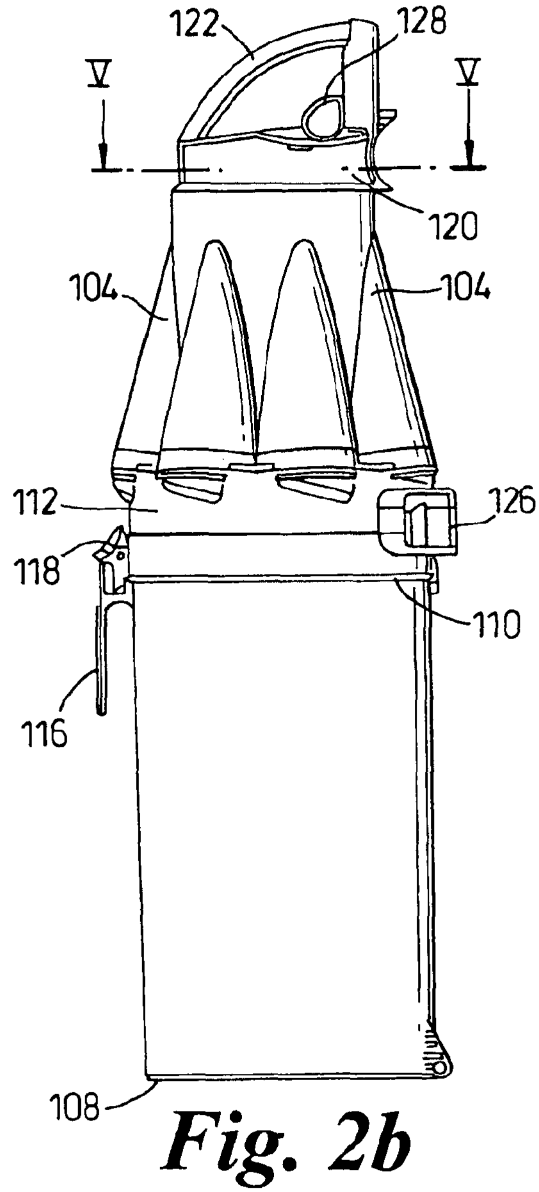
Figure 2C:
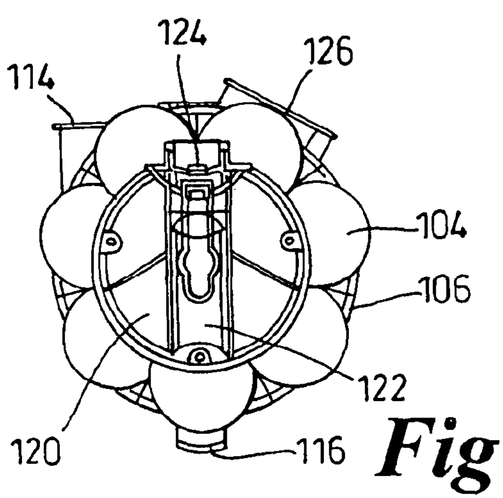

This principle of operation of the vacuum cleaner 10 is known from the prior art. This invention is concerned with the cyclonic separation apparatus 100 which is illustrated in FIGS. 2*a*, 2*b* and 2*c* in isolation from the vacuum cleaner 10.

The cyclonic separation apparatus 100 illustrated in FIG. 2 has an upstream cyclone unit 101 that includes a single upstream cyclone 102 and a downstream cyclone unit 103 including a plurality of downstream cyclones 104. The upstream cyclone 102 includes a cylindrical bin 106 having a closed base 108. The open upper end 110 of the cylindrical bin abuts against a circular upper molding 112 which defines an upper end of the upstream cyclone 102. An inlet port 114 is provided in the cylindrical bin 106 in order to allow dirty air to be introduced to the interior of the upstream cyclone 102. The inlet port 114 is shaped, positioned and configured to communicate with the upstream ducting which carries dirt-laden air from the cleaner head 16 to the cyclonic separating apparatus 100. A handle 116 and a catch 118 are provided on the cylindrical bin 106 and the upper molding 112 respectively in order to provide means for releasing the cylindrical bin 106 from the upper molding 112 when the cylindrical bin 106 requires to be emptied. A seal (not shown) can be provided between the cylindrical bin 106 and the upper molding 112 if required.

The base 108 of the cylindrical bin can be hingedly connected to the remainder of the cylindrical bin in order to provide further access to the interior of the cylindrical bin 106 for emptying purposes if required. The embodiment illustrated herein will include a mechanism for allowing the base 108 to be hingedly opened in order to allow emptying, but the details of such a mechanism form the subject of a copending application and will not be described any further here.

Seven identical downstream cyclones 104 are provided in the downstream cyclone unit 103. The downstream cyclones 104 are equi-angularly spaced about the central longitudinal axis 150 of the downstream cyclone unit 103, which is coincident with the longitudinal axis of the upstream cyclone unit 101. The arrangement is illustrated in FIG. 2*c*. Each downstream cyclone 104 is frusto-conical in shape with the larger end thereof located lowermost and the smaller end uppermost. Each downstream cyclone 104 has a longitudinal axis 148 (see FIG. 3*b*) which is inclined slightly towards the longitudinal axis 150 of the downstream cyclone unit 103. This feature will be described in more detail below. Also, the outermost point of the lowermost end of each downstream cyclone 104 extends radially further from the longitudinal axis 150 of the downstream cyclone unit 103 than the wall of the cylindrical bin 106. The uppermost ends of the downstream cyclones 104 project inside a collection molding 120 which extends upwardly from the surfaces of the downstream cyclones 104. The collection molding 120 supports a handle 122 by means of which the entire cyclonic separation apparatus 100 can be transported. A catch 124 is provided on the handle 122 for the purposes of securing the cyclonic separation apparatus 100 to the upstanding body 12 at the upper end thereof. An outlet port 126 is provided in the upper molding 112 for conducting cleaned air out of the cyclonic separating apparatus 100. The outlet port 126 is arranged and configured to co-operate with the downstream ducting 26 for carrying the cleaned air to the motor casing 14.

The collection molding 120 also carries an actuating lever 128 designed to activate a mechanism for opening the base 108 of the cylindrical bin 106 for emptying purposes as mentioned above.

Figure 3A:
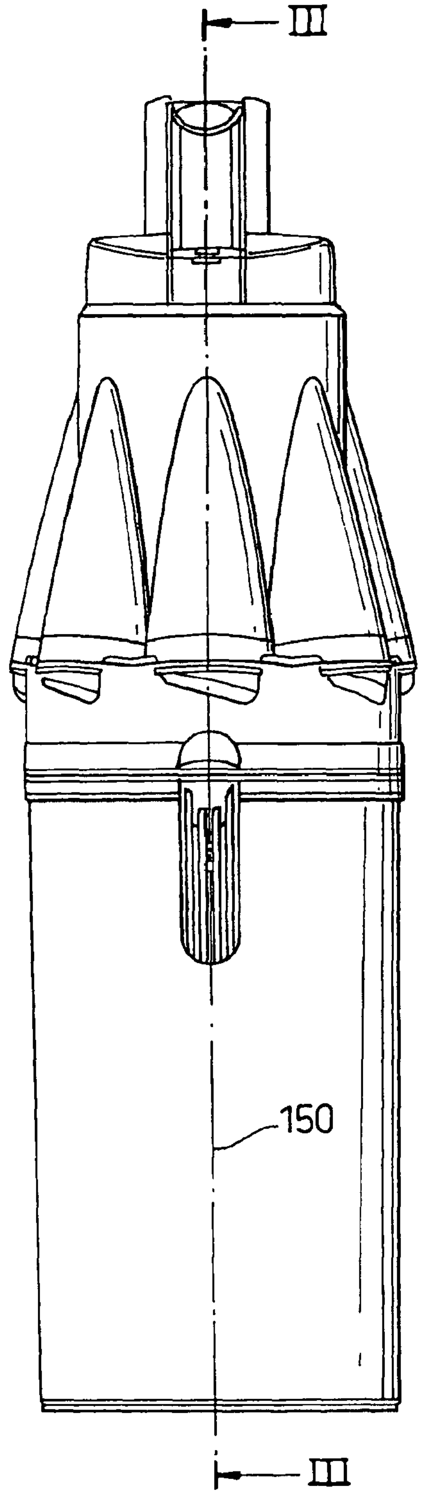
FIGS. 3*a* and 3*b* are front and sectional side views, respectively, of the cyclonic separating apparatus of FIGS. 2*a*, 2*b* and 2*c*, FIG. 3*b* being taken along line III—III of FIG. 3*a;*
Figure 3B:
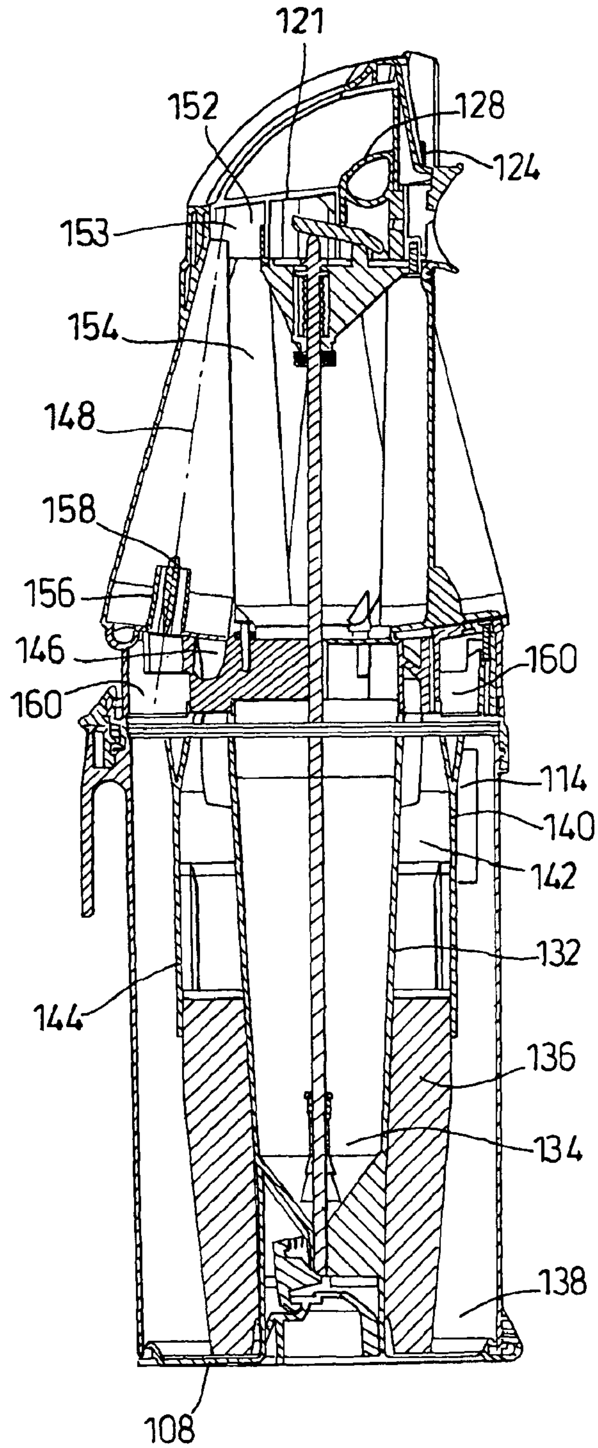

The internal features of the cyclonic separating apparatus 100 will now be described with reference to FIG. 3*b*. FIG. 3*a* corresponds to FIG. 2*a* and indicates the line III—III on which the section of FIG. 3*b* is taken.

The internal features of the upstream cyclone 102 include an internal wall 132 extending the entire length thereof. The internal space defined by the internal wall 132 communicates with the interior of the collection molding 120 as will be described below. The purpose of the internal wall 132 is to define a collection space 134 for fine dust. Located inside the internal wall 132 and in the collection space 134 are components for allowing the base 108 to open when the actuating lever 128 is actuated. The precise details and operation of these components are immaterial to the present invention and will not be described any further here.

Mounted externally of the internal wall 132 are four equi-spaced baffles or fins 136 which project radially outwardly from the internal wall 132 towards the cylindrical bin 106. These baffles 136 assist with the deposition of large dirt and dust particles in the collection space 138 defined between the internal wall 132 and the cylindrical bin 106 adjacent the base 108. The particular features of the baffles 136 are described in more detail in WO 00/04816, the disclosure of which is incorporated by reference.

Located outwardly of the internal wall 132 in an upper portion of the upstream cyclone 102 is a shroud 140. The shroud extends upwardly from the baffles 136 and, together with the internal wall 132, defines an air passageway 142. The shroud 140 has a perforated portion 144 allowing air to pass from the interior of the upstream cyclone 102 to the air passageway 142. The air passageway 142 communicates with the inlet 146 of each of the downstream cyclones 104. Each inlet 146 is arranged in the manner of a scroll so that air entering each downstream cyclone 104 is forced to follow a helical path within the respective downstream cyclone 104.

As previously mentioned, the longitudinal axis 148 of each downstream cyclone 104 is inclined towards the longitudinal axis 150 of the downstream cyclone unit 103. The upper end of each downstream cyclone 104 is closer to the longitudinal axis 150 than the lower end thereof. In this embodiment, the angle of inclination of the relevant axes 148 is substantially 7.5°.

Figure 5:
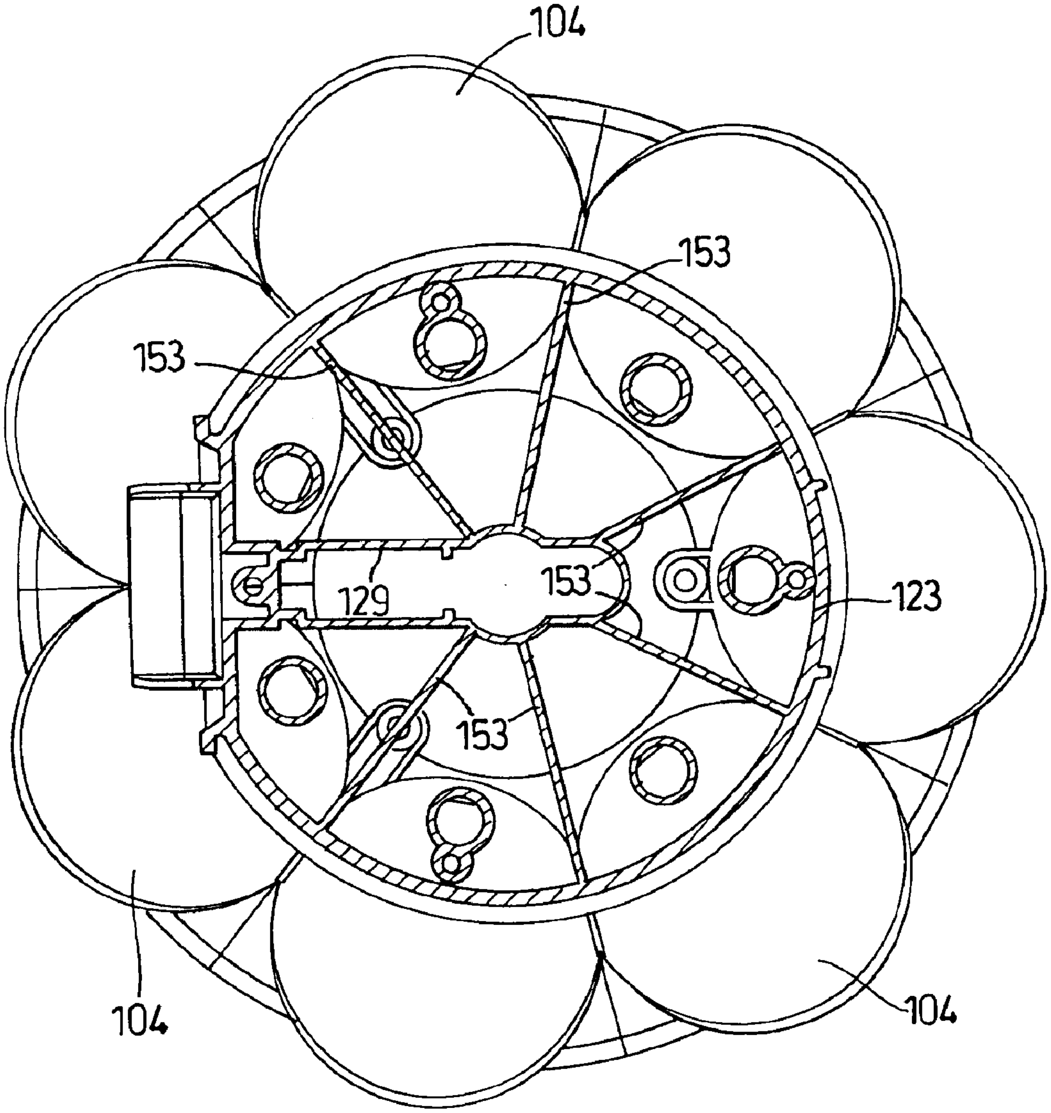
FIG. 5 is a sectional view of the portion of the cyclonic separating apparatus of FIGS. 2*a*, 2*b* and 2*c* taken along line V—V of FIG. 2*b;*

The upper ends of the downstream cyclones 104 project inside the collection molding 120, as previously mentioned. The interior of the collection molding 120 defines a chamber 152 with which the upper ends of the downstream cyclones 104 communicate. Inside the chamber 152, a plurality of generally radially extending fins 153 project downwardly from the upper surface 121 of the collection molding 120 (see FIG. 5). The fins 153 extend inwardly from the outer wall 123 of the collection molding 120 to an inner wall 129 which surrounds the mechanism for opening the base 108 of the cylindrical bin 106 for emptying purposes. The fins 153 project downwardly to a level below that of the upper ends of the cyclones 104. This arrangement prevents any dirt and dust exiting the upper end of one of the cyclones 104 from travelling to and passing into an adjacent cyclone via its open upper end. If this were to happen, there would be a risk of the dirt and dust previously separated from the airflow by the first cyclone being returned to the airflow via the adjacent cyclone.

The collection molding 120 and the surfaces of the downstream cyclones 104 together define an axially extending passageway 154, located between the downstream cyclones 104, which communicates with the collection space 134 defined by the internal wall 132. It is thus possible for dirt and dust which exits the smaller ends of the downstream cyclones 104 to pass from the chamber 152 to the collection space 134 via the passageway 154.

Each downstream cyclone 104 has an air exit in the form of a vortex finder 156. Each vortex finder 156 is located centrally of the lowermost end of the respective downstream cyclone 104, as is the norm. In this embodiment, a center body 158 is located in each vortex finder 156. Each vortex finder communicates with an annular chamber 160 which, in turn, communicates with the outlet port 126 (see FIG. 2*c*).

FIGS. 4*a*, 4*b* and 4*c* illustrate the arrangement of the downstream cyclones 104 in greater detail. In particular, this helps to illustrate the configuration of the passageway 154. FIG. 4*b* also helps to illustrate the fact that the side of each of the downstream cyclones 104 closest to the longitudinal axis of the downstream cyclone unit 103 lies substantially parallel thereto.

The mode of operation of the apparatus described above is as follows. Dirty air (air in which dirt and dust is entrained) enters the cyclonic separating apparatus 100 via the inlet port 114 . The arrangement of the inlet port 114 is essentially tangential to the wall of the cylindrical bin 106 which causes the incoming air to follow a helical path around the inside of the cylindrical bin 106. Larger dirt and dust particles, along with fluff and other large debris, are deposited in the collection space 138 adjacent the base 108 by virtue of the effect of centrifugal forces acting on the particles, as is well known. Partially cleaned air travels inwardly and upwardly away from the base 108, exiting the upstream cyclone 102 via the perforated portion 144 of the shroud 140. The partially-cleaned air then moves along the air passageway 142 in which it is divided into seven portions. Each portion enters one of the downstream cyclones 104 via the respective inlet 146. As has been mentioned above, each inlet 146 is a scroll inlet which forces the incoming air to follow a helical path inside the downstream cyclone 104. The tapering shape of the downstream cyclone 104 causes further, intense cyclonic separation to take place inside the downstream cyclone 104 so that very fine dirt and dust particles are separated from the main airflow. The dirt and dust particles exit the uppermost end of the downstream cyclone 104 while the cleaned air returns to the lower end of the downstream cyclone 104 along the axis 148 thereof and exits via the vortex finder 156. The cleaned air passes from the vortex finder 156 into the annular chamber 162 and from there to the outlet port 126. Meanwhile, the dirt and dust which has been separated from the airflow in the downstream cyclone 104 falls from the chamber 152 through the passage way 154 to the collection space 134. It is prevented from passing to the open uppermost end of the adjacent cyclones 104 by the fins 153.

When it is desired to empty the cyclonic separating apparatus 100, the base 108 can be hingedly released from the sidewall of the cylindrical bin 106 so that the dirt and debris collected in collection spaces 134 and 138 can be allowed to drop into an appropriate receptacle. As previously explained, the detailed operation of the emptying mechanism does not form part of the present invention and will not be described any further here.

Figure 6:
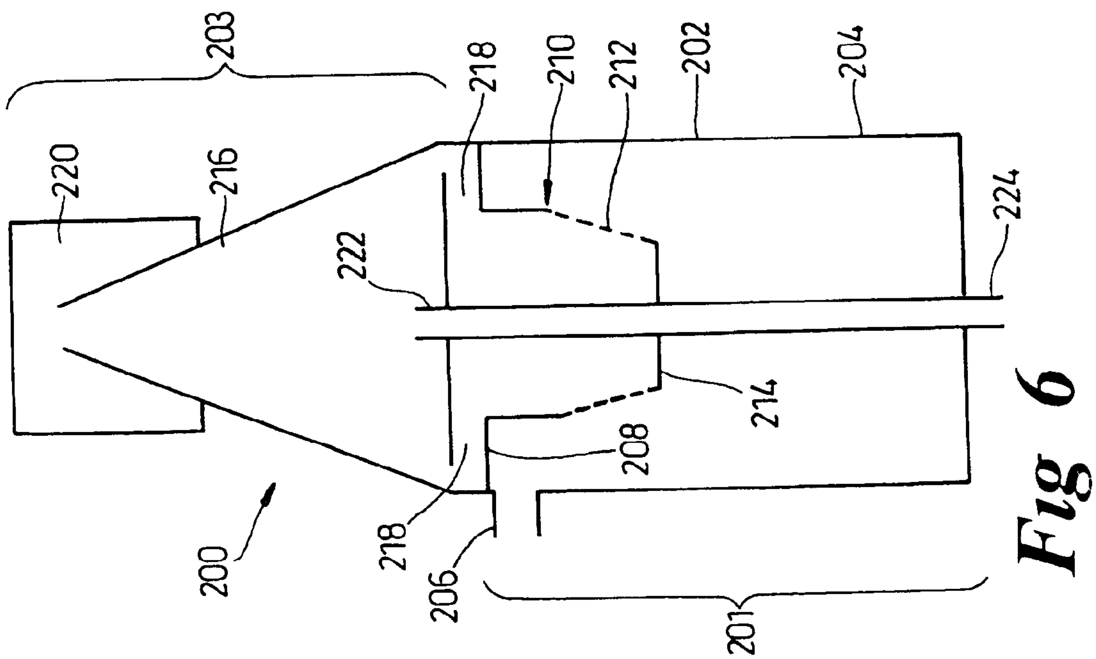
FIG. 6 is a schematic side view of a second embodiment of cyclonic separating apparatus according to the invention and suitable for use in a vacuum cleaner.

The invention is not limited to the precise details of the embodiment described above. A second embodiment of cyclonic separating apparatus 200 suitable for use in a domestic vacuum cleaner is illustrated schematically in FIG. 6. In this embodiment, the apparatus 200 includes an upstream cyclone unit 201 having a single upstream cyclone 202. The upstream cyclone unit 202 includes a substantially cylindrical bin 204 having a tangential inlet 206 arranged at the upper end thereof. The cylindrical bin 204 is partially closed at its upper end by an annular barrier 208. Depending from the annular barrier 208 is a shroud 210 having a perforated section 212 above its lower end 214. The annular barrier 208 extends radially from the shroud 210 to the outer wall of the cylindrical bin 204. A downstream cyclone unit 203 comprising a single downstream cyclone 216 is arranged above the upstream cyclone 202. The downstream cyclone 216 is frusto-conical in shape with the larger end thereof arranged lowermost. The diameter of the lowermost end of the downstream cyclone 216 corresponds generally to the diameter of the upstream cyclone 202. A plurality of tangential inlet ports 218 provide communication between the upper end of the shroud 210 and the interior of the downstream cyclone 216 at the lowermost end thereof.

The uppermost end of the downstream cyclone 216 opens into a collection chamber 220 which is sealed about the uppermost end of the downstream cyclone 216. The collection chamber 220 is preferably cylindrical, but can take any other convenient shape. The diameter of the collection chamber 220 immediately above the upper end of the downstream cyclone 216 is at least three times the diameter of the uppermost end of the downstream cyclone 216. A vortex finder 222 is located centrally of the downstream cyclone at the lower most end thereof. The vortex finder 222 communicates with an elongate exit pipe 224 which passes along the axis of the cylindrical bin 204 and through the base thereof.

This arrangement operates in the following manner. Dirt-laden air enters the apparatus 200 via tangential inlet 206 and cyclonic motion is set up inside the upstream cyclone 202. Larger particles of dirt and debris are collected in the cylindrical bin 204 adjacent the base thereof while the partially-cleaned air exits the upstream cyclone 202 via the perforated section 212 of the shroud 210. The partially-cleaned air then passes into the downstream cyclone 216 via the tangential inlet ports 218. Fine dirt and dust particles are separated in the downstream cyclone 216 and the dirt and dust particles exit the upper end of the downstream cyclone 216 and collect inside the collection chamber 220. Clean air passes out of the downstream cyclone 216 via the vortex finder 212 and exits the cyclonic separating apparatus 200 via the outlet pipe 224.

Figure 7:
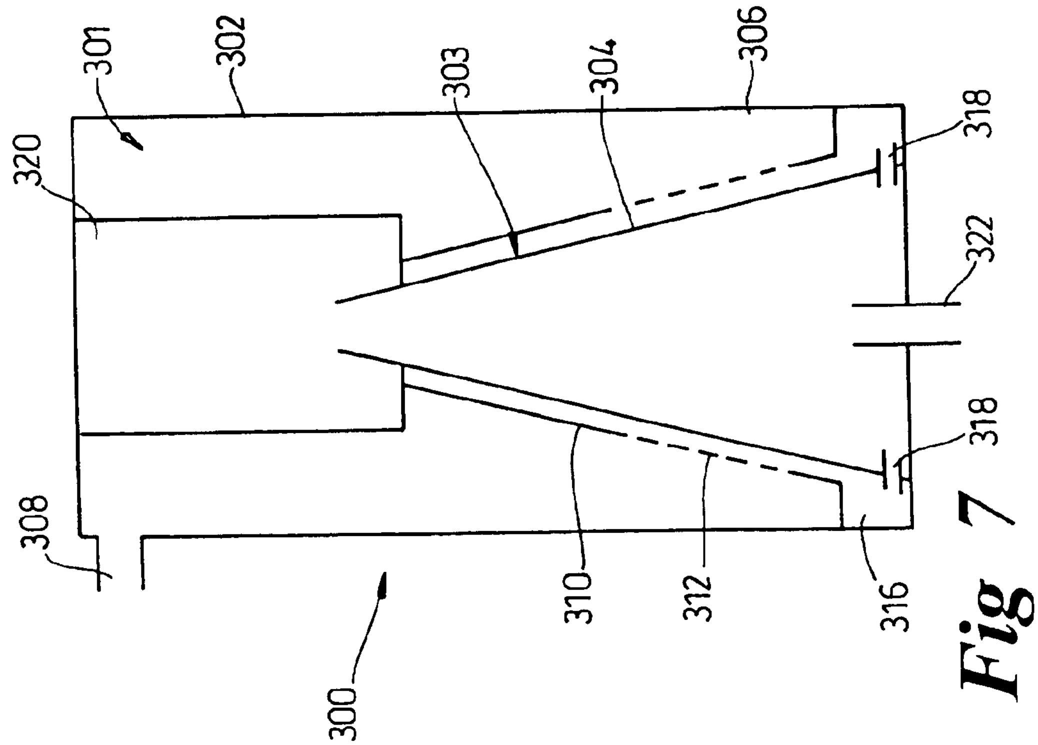
FIG. 7 is a schematic side view of a third embodiment of cyclonic separating apparatus according to the invention and suitable for use in a vacuum cleaner.

A further embodiment is illustrated in FIG. 7. The apparatus 300 shown here includes an upstream cyclone unit 301 comprising a single upstream cyclone 302 and a downstream cyclone unit 303 comprising a single downstream cyclone 304. The upstream cyclone 302 includes a cylindrical bin 306 having a tangential inlet 308 located at the upper end thereof. The downstream cyclone 304 is frusto-conical in shape having its larger end lowermost and its smaller end uppermost, as before, but is arranged inside the upstream cyclone 302. Thus the larger end of the downstream cyclone 304 is located adjacent the base of the cylindrical bin 306 remote from the inlet 308 and the smaller end of the downstream cyclone 304 projects inside the cylindrical bin 306 towards the inlet 308 thereof.

A shroud 310 is positioned inside the upstream cyclone 302 and surrounding the majority of the downstream cyclone 304. The shroud 310 has a perforated portion 312 which provides an outlet for partially-cleaned air to escape from the upstream cyclone 302. A passageway 314 is formed between the shroud 310 and the surface of the downstream cyclone 304 along which the escaping air can pass. The passageway 314 communicates with an annular chamber 316 from which a plurality of tangential inlets 318 lead to the lowermost end of the downstream cyclone 304.

The upper end of the downstream cyclone 304 opens into a collector chamber 320 which surrounds the upper end of the downstream cyclone 304. The collector chamber 320 is sealed against the outer surface of the downstream cyclone 304 so that dirt and dust emitted into the collector chamber 320 are contained therein. Access to the collector chamber 320 is provided in any suitable form to allow collected dirt and dust to be removed for emptying purposes. For example, a removable portion may be provided in the end of the collector chamber 320 to allow the collector chamber 320 to be inverted and emptied. A vortex finder 322 is provided in the center of the lowermost end of the downstream cyclone 304 to provide an exit path for cleaned air from the downstream cyclone 304.

In operation, dirty air enters the upstream cyclone 302 via the tangential inlet 308 and follows a helical path down the cylindrical bin 306 thus effecting centrifugal separation of larger dirt and debris which is collected in the bottom of the bin 306. The partially-cleaned air exits the upstream cyclone through the perforated portion 312 of the shroud 310 and passes along the passageway 314 to the annular chamber 316. From there, the partially-cleaned air passes along the tangential inlets 318 and into the interior of the downstream cyclone 304 where it is again forced to follow a helical path. Intense centrifugal separation occurs as the air passes up the cyclone 304 towards the smaller end thereof. Separated dirt and dust particles are emitted from the smaller end of the cyclone 304 and collected in the collector chamber 320 while cleaned air exits the cyclone 304 via the vortex finder. From the vortex finder, the cleaned air is ducted away from the cyclonic separating apparatus 300 to the motor for cooling purposes.

The invention is not limited to the precise details of the embodiments described above. It must be stressed that the features of the vacuum cleaner in which the cyclonic cleaning apparatus is to be used are immaterial to the invention. Indeed, it is envisaged that cyclonic separating apparatus of the type described above can be put to use in other areas where good separation efficiencies combined with low pressure drops are required. It will be appreciated that, if desired, either or both of the upstream and downstream cyclone units can be made up of either a single cyclone or a plurality of cyclones arranged in parallel. Furthermore, there is no particular need for the apparatus to be arranged so that the axes of the cyclone units are vertical and the axes may indeed be inclined to the vertical or even horizontal if desired. The fact that centrifugal separation is not greatly affected by gravity makes this possible as long as the collecting areas of the cyclone units are arranged to collect the debris without interference to the airflow paths necessary to effect separation. In a further variation to the embodiments described in detail above, the downstream cyclones illustrated in FIGS. 1 to 5 may be arranged so that their respective axes are arranged parallel to one another instead of being inclined towards the axis of the downstream cyclone unit as shown in the drawings. Other variations and modifications will be apparent to a skilled reader.

What is claimed is:

1. A cyclonic separating apparatus comprising an upstream cyclone unit and a downstream cyclone unit, the upstream cyclone unit comprising at least one cyclone having a first end and a second end, and the downstream cyclone unit comprising at least one cyclone having a first end and a second end, wherein the upstream and downstream cyclone units are arranged relative to one another so that the orientation of at least one cyclone of the downstream cyclone unit is substantially inverted with respect to the orientation of at least one cyclone of the upstream cyclone unit and wherein the at least one cyclone of the upstream cyclone unit is substantially cylindrical in shave between the first and second ends thereof.

2. The cyclonic separating apparatus of claim 1, wherein at least one cyclone of the upstream cyclone unit has an inlet located at the first end thereof.

3. The cyclonic separating apparatus of claim 2, wherein at least one cyclone of the upstream cyclone unit has an outlet located at the first end thereof.

4. The cyclonic separating apparatus of claim 3, wherein the at least one cyclone of the upstream cyclone unit has a collector or collection area located at the second end thereof.

5. The cyclonic separating apparatus of claim 1, 2, 3 or 4, wherein at least one cyclone of the downstream cyclone unit has an inlet located at the first end thereof.

6. The cyclonic separating apparatus of claim 5, wherein at least one cyclone of the downstream cyclone unit has an outlet located at the first end thereof.

7. The cyclonic separating apparatus of claim 6, wherein at least one cyclone of the downstream cyclone unit has a collector located at the second end thereof.

8. The cyclonic separating apparatus of claim 1, wherein at least one cyclone of the downstream cyclone unit has an inlet located at the first end thereof.

9. The cyclonic separating apparatus of claim 8, wherein at least one cyclone of the downstream cyclone unit has an outlet located at the first end thereof.

10. The cyclonic separating apparatus of claim 9, wherein at least one cyclone of the downstream cyclone unit has a collector located at the second end thereof.

11. The cyclonic separating apparatus of claim 1, 2, 3 or 4, wherein the at least one cyclone of the downstream cyclone unit is frusto-conical in shape between the first and second ends thereof.

12. The cyclonic separating apparatus of claim 1, wherein the orientation of the at least one cyclone of the upstream cyclone unit is inclined to the vertical with the first end or ends thereof uppermost, and the orientation of the at least one cyclone of the downstream cyclone unit is inclined to the vertical with the first end or ends lowermost.

13. The cyclonic separating apparatus of claim 7, wherein the second ends of the cyclones of the downstream cyclone unit project into the collector and fins are provided between the second ends of adjacent cyclones.

14. The cyclonic separating apparatus of claim 9, wherein the second ends of the cyclones of the downstream cyclone unit project into the collector and fins are provided between the second ends of adjacent cyclones.

15. The cyclonic separating apparatus of claim 13, wherein the fins project downwardly from a closed upper surface of the collector to a level below that of the second ends of the cyclones of the downstream cyclone unit.

16. The cyclonic separating apparatus of claim 14, wherein the fins project downwardly from a closed upper surface of the collector to a level below that of the second ends of the cyclones of the downstream cyclone unit.

17. The cyclonic separating apparatus of claim 1, 2, 3 or 4, wherein at least one cyclone of the downstream cyclone unit is located wholly inside a cyclone of the upstream cyclone unit.

18. The cyclonic separating apparatus of claim 12, wherein at least one cyclone of the downstream cyclone unit is located wholly inside a cyclone of the upstream cyclone unit.

19. A cyclonic separating apparatus comprising an upstream cyclone unit and a downstream cyclone unit, the upstream cyclone unit comprising at least one cyclone having a first end and a second end, and the downstream cyclone unit comprising at least one cyclone having a first end and a second end, wherein the upstream and downstream cyclone units are arranged relative to one another so that the orientation of at least one cyclone of the downstream cyclone unit is substantially inverted with respect to the orientation of at least one cyclone of the upstream cyclone unit and wherein the downstream cyclone unit comprises a plurality of cyclones arranged in parallel with the first ends thereof adjacent one another.

20. The cyclonic separating apparatus of claim 19, wherein the longitudinal axes of the cyclones of the downstream cyclone unit are parallel to one another.

21. The cyclonic separating apparatus of claim 19, wherein the longitudinal axes of the cyclones of the downstream cyclone unit are inclined to one another so that the cyclones are nearer to one another at the second ends thereof.

22. The cyclonic separating apparatus of claim 19, wherein the orientation of the at least one cyclone of the upstream cyclone unit is substantially vertical with the first end or ends thereof uppermost, and the orientation of the at least one cyclone of the downstream cyclone unit is substantially vertical with the first end or ends lowermost.

23. The cyclonic separating apparatus of claim 21, wherein the orientation of the at least one cyclone of the upstream cyclone unit is substantially vertical with the first end or ends thereof uppermost, and the orientation of the at least one cyclone of the downstream cyclone unit is substantially vertical with the first end or ends lowermost.

24. The cyclonic separating apparatus of claim 19, wherein the orientation of the at least one cyclone of the upstream cyclone unit is inclined to the vertical with the first end or ends thereof uppermost, and the orientation of the at least one cyclone of the downstream cyclone unit is inclined to the vertical with the first end or ends lowermost.

25. The cyclonic separating apparatus of claim 21, wherein the orientation of the at least one cyclone of the upstream cyclone unit is inclined to the vertical with the first end or ends thereof uppermost, and the orientation of the at least one cyclone of the downstream cyclone unit is inclined to the vertical with the first end or ends lowermost.

26. The cyclonic separating apparatus of claim 19, wherein the second ends of the cyclones of the downstream cyclone unit project into the collector and fins are provided between the second ends of adjacent cyclones.

27. The cyclonic separating apparatus as claimed in claim 7, 9 or 19, wherein the second ends of the cyclones of the downstream cyclone unit project into the collector and fins are provided between the second ends of adjacent cyclones.

28. The cyclonic separating apparatus of claim 26, wherein the fins project downwardly from a closed upper surface of the collector to a level below that of the second ends of the cyclones of the downstream cyclone unit.

29. The cyclonic separating apparatus of claim 27, wherein the fins project downwardly from a closed upper surface of the collector to a level below that of the second ends of the cyclones of the downstream cyclone unit.

30. The cyclonic separating apparatus of claim 19, wherein at least one cyclone of the downstream cyclone unit is located wholly inside a cyclone of the upstream cyclone unit.

31. The cyclonic separating apparatus of claim 21, wherein at least one cyclone of the downstream cyclone unit is located wholly inside a cyclone of the upstream cyclone unit.

32. A cyclonic separating apparatus comprising an upstream cyclone unit and a downstream cyclone unit, the upstream cyclone unit comprising at least one cyclone having a first end and a second end, and the downstream cyclone unit comprising at least one cyclone having a first end and a second end, wherein the upstream and downstream cyclone units are arranged relative to one another so that the orientation of at least one cyclone of the downstream cyclone unit is substantially inverted with respect to the orientation of at least one cyclone of the upstream cyclone unit, wherein the at least one cyclone of the upstream cyclone unit is substantially cylindrical in shape between the first and second ends thereof, and wherein the downstream cyclone unit comprises a plurality of cyclones arranged in parallel with the first ends thereof adjacent one another.

33. The cyclonic separating apparatus of claim 32, wherein the longitudinal axes of the cyclones of the downstream cyclone unit are parallel to one another.

34. The cyclonic separating apparatus of claim 32, wherein the longitudinal axes of the cyclones of the downstream cyclone unit are inclined to one another so that the cyclones are nearer to one another at the second ends thereof.

35. The cyclonic separating apparatus of claim 33, wherein the orientation of the at least one cyclone of the upstream cyclone unit is substantially vertical with the first end or ends thereof uppermost, and the orientation of the at least one cyclone of the downstream cyclone unit is substantially vertical with the first end or ends lowermost.

36. The cyclonic separating apparatus of claim 32, wherein the orientation of the at least one cyclone of the upstream cyclone unit is inclined to the vertical with the first end or ends thereof uppermost, and the orientation of the at least one cyclone of the downstream cyclone unit is inclined to the vertical with the first end or ends lowermost.

37. The cyclonic separating apparatus of claim 33, wherein the orientation of the at least one cyclone of the upstream cyclone unit is inclined to the vertical with the first end or ends thereof uppermost, and the orientation of the at least one cyclone of the downstream cyclone unit is inclined to the vertical with the first end or ends lowermost.

38. The cyclonic separating apparatus of claim 32, wherein at least one cyclone of the downstream cyclone unit is located wholly inside a cyclone of the upstream cyclone unit.

39. The cyclonic separating apparatus of claim 33, wherein at least one cyclone of the downstream cyclone unit is located wholly inside a cyclone of the upstream cyclone unit.

40. The cyclonic separating apparatus of claim 32, wherein the orientation of the at least one cyclone of the upstream cyclone unit is substantially vertical with the first end or ends thereof uppermost, and the orientation of the at least one cyclone of the downstream cyclone unit is substantially vertical with the first end or ends lowermost.

* * * * *

UNITED STATES PATENT AND TRADEMARK OFFICE

CERTIFICATE OF CORRECTION

PATENT NO. : 6,994,740 B2 Page 1 of 1
DATED : February 7, 2006
INVENTOR(S) : Peter D. Gammack et al.

It is certified that error appears in the above-identified patent and that said Letters Patent is hereby corrected as shown below:

<u>Column 9,</u>
Line 11, replace "shave" with -- shape --.

Signed and Sealed this

Second Day of May, 2006

JON W. DUDAS
*Director of the United States Patent and Trademark Office*

UNITED STATES PATENT AND TRADEMARK OFFICE

CERTIFICATE OF CORRECTION

PATENT NO. : 6,994,740 B2
APPLICATION NO. : 10/640568
DATED : February 7, 2006
INVENTOR(S) : Peter D. Gammack et al.

It is certified that error appears in the above-identified patent and that said Letters Patent is hereby corrected as shown below:

On the Front Page, Under Assignee, item [73]:

Please delete "Dyson Limited" and replace with --Dyson Technology Limited--

In the Claims:

In Claim 1, Column 9, line 11, replace "shave" with --shape--

Signed and Sealed this

Twenty-ninth Day of January, 2008

JON W. DUDAS
*Director of the United States Patent and Trademark Office*